United States Patent
Ash, Jr. et al.

(10) Patent No.: US 8,248,314 B2
(45) Date of Patent: Aug. 21, 2012

(54) INDUCTIVELY COUPLED SIGNAL BOOSTER FOR A WIRELESS COMMUNICATION DEVICE AND IN COMBINATION THEREWITH

(76) Inventors: Daniel R. Ash, Jr., Laguna Niguel, CA (US); Daniel R. Ash, Sr., Drain, OR (US)

(*) Notice: Subject to any disclaimer, the term of this patent is extended or adjusted under 35 U.S.C. 154(b) by 0 days.

(21) Appl. No.: 13/238,894

(22) Filed: Sep. 21, 2011

(65) Prior Publication Data

US 2012/0071214 A1 Mar. 22, 2012

Related U.S. Application Data

(60) Provisional application No. 61/385,386, filed on Sep. 22, 2010.

(51) Int. Cl.
*H04M 1/00* (2006.01)
*H01Q 1/24* (2006.01)

(52) U.S. Cl. ............... 343/702; 455/571; 343/718

(58) Field of Classification Search .......... 455/571, 455/550.1, 90.3, 575.7, 575.1; 343/713, 343/723, 718, 833, 834, 895, 702
See application file for complete search history.

(56) References Cited

U.S. PATENT DOCUMENTS

| | | | |
|---|---|---|---|
| 5,170,494 A | 12/1992 | Levanto | |
| 5,532,703 A | 7/1996 | Stephens et al. | |
| 5,673,053 A | 9/1997 | Marthinsson | |
| 5,854,970 A | 12/1998 | Kivela | |
| 6,061,028 A * | 5/2000 | Sakata | 343/702 |
| 6,111,545 A | 8/2000 | Saari | |
| 6,112,106 A | 8/2000 | Crowley et al. | |
| 6,281,854 B1 * | 8/2001 | Ohoka et al. | 343/767 |
| 6,317,089 B1 | 11/2001 | Wilson et al. | |
| 6,380,623 B1 * | 4/2002 | Demore | 257/723 |
| 6,459,915 B2 | 10/2002 | Nakamura et al. | |
| 6,492,952 B1 | 12/2002 | Hu | |
| 6,538,620 B2 * | 3/2003 | Lin | 343/895 |
| 6,924,769 B2 | 8/2005 | Ito et al. | |
| 7,081,857 B2 | 7/2006 | Kinnunen et al. | |
| 7,084,819 B2 * | 8/2006 | De La Torre Barreiro et al. | 343/702 |
| 7,218,280 B2 * | 5/2007 | Annamaa et al. | 343/700 MS |
| 7,231,236 B2 | 6/2007 | Cho | |
| 7,405,698 B2 * | 7/2008 | de Rochemont | 343/700 MS |
| 7,427,961 B2 * | 9/2008 | Song et al. | 343/713 |
| 7,719,083 B2 * | 5/2010 | Chang | 257/531 |
| 7,881,693 B2 * | 2/2011 | Kurokawa | 455/343.1 |

FOREIGN PATENT DOCUMENTS

| | | |
|---|---|---|
| CN | 201233951 Y | 5/2009 |
| JP | 2006148751 | 6/2006 |
| WO | 2010/098540 | 2/2010 |

* cited by examiner

*Primary Examiner* — Sonny Trinh
(74) *Attorney, Agent, or Firm* — Gene Scott; Patent Law & Venture Group

(57) ABSTRACT

A passively re-radiating cell phone sleeve assembly capable of conforming to and nesting with a cell phone provides a partial enclosure capable of fitting over at least a portion of the cell phone. A multi-layer radio frequency (RF) coupling probe is fully embedded within the enclosure in a position that is in close proximity to an internal antenna of the cell phone when the enclosure is nested with the cell phone. A coupling probe is inductively coupled to the internal antenna for sharing RF signals and is desensitized from de-tuning the internal antenna of the cell phone. An external antenna is mounted on the enclosure; and a transmission line embedded within the enclosure joins the coupling probe and the external antenna for RF signal transfer. RF transmission signals of the cell phone are radiated from both the internal and the external antennae simultaneously and without mutual interference.

12 Claims, 3 Drawing Sheets

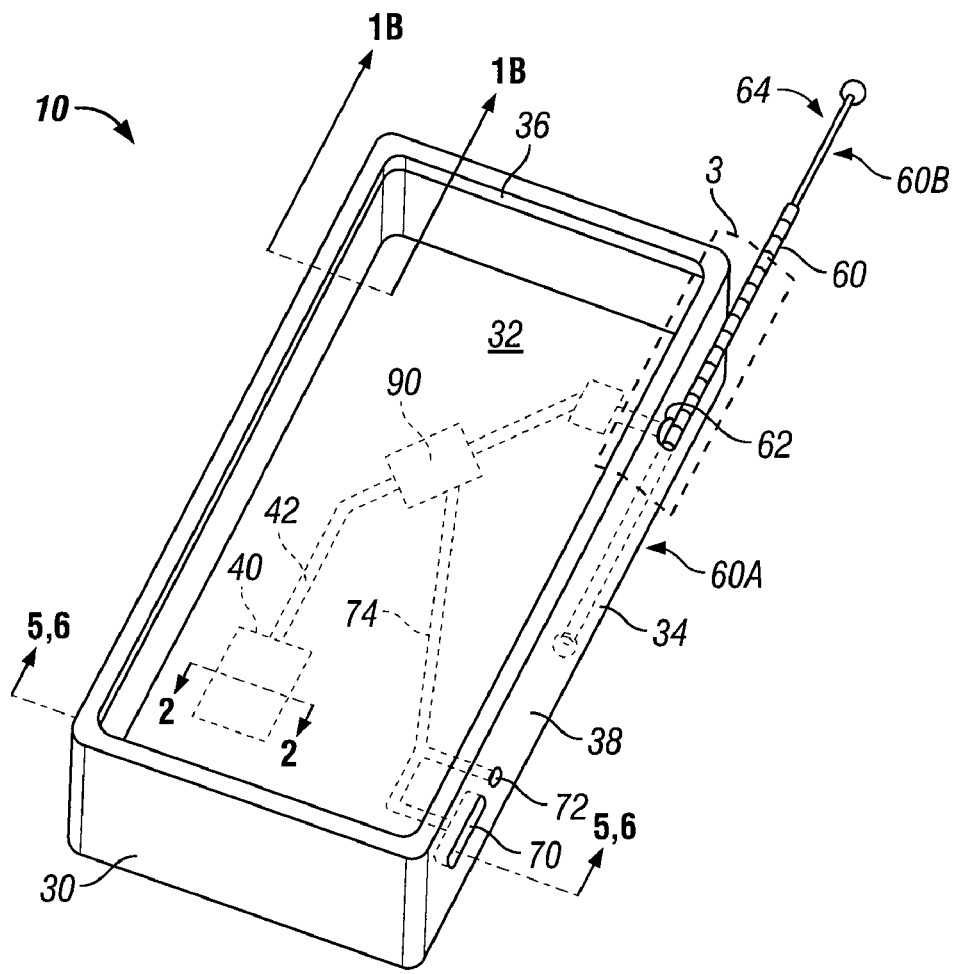
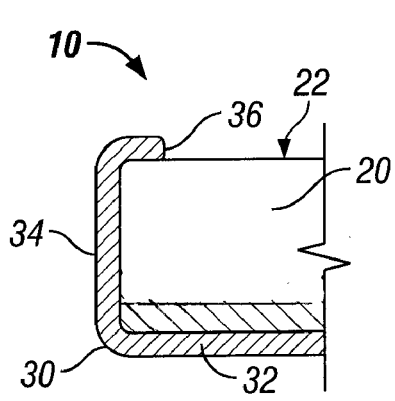
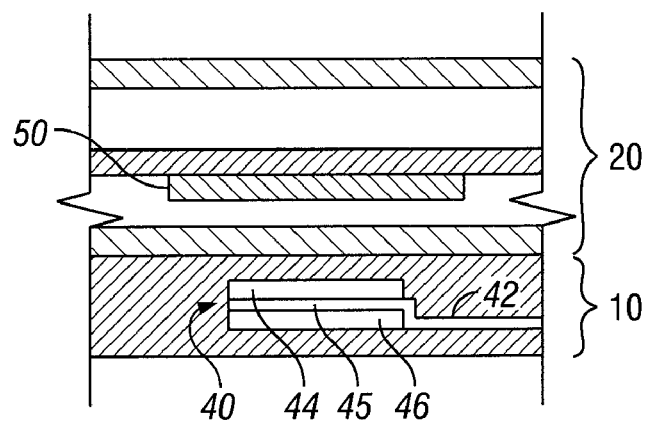
FIG. 1A
FIG. 1B
FIG. 2

INDUCTIVELY COUPLED SIGNAL BOOSTER FOR A WIRELESS COMMUNICATION DEVICE AND IN COMBINATION THEREWITH

RELATED APPLICATIONS

This application describes the same apparatus and combination as described in co-pending provisional application 61/385,386, filed on Sep. 22, 2010, and claims international date priority thereof. The subject matter of application 61/385,386 is hereby incorporated herein by reference.

BACKGROUND

This disclosure relates to the field of wireless telecommunications and more particularly to a sleeve enclosure for receiving a wireless communicating device and for boosting the signal of the device. Cellular telephones are notorious for dropping calls, for poor or intermittent transmission and reception of signal and for lack of consistent signal strength. Solutions to this problem include providing more and more-closely spaced base stations, the use of add-on antennas and the use of complimentary antennas. For instance, publication WO 2020/098540 discloses a double molding process wherein in a first molding step, an antenna is embedded within a resin jacket and in a second molding step the resin jacket is embedded within a device case by an insertion molding processes. Likewise, publication JP2006/148751 discloses the coupling of antennas built into a cover which when placed over the case of a portable terminal are positioned in close proximity to internal antennas of the terminal and are thereby able to be inductively coupled for strengthening transmitted signals. However, the prior art fails to describe a high efficiency proximity probe which is embedded within and located in a phone sleeve in a position for coupling with the phone's internal antenna and which is electrically connected with an external antenna via conductive paths also embedded within the phone sleeve. The presently described apparatus overcomes the drawbacks and failings of the prior art.

SUMMARY

The present disclosure describes an apparatus; a sleeve capable of receiving a cell phone or other portable wireless communication device and of boosting the device's RF signal reception and transmission. The term "cell phone" is used herein as an example of the type of device that might be used with the sleeve apparatus, however, it should be understood that beside a cell phone, other portable RF signaling communication devices may be used with the described sleeve. An RF probe embedded in the sleeve is positioned to lie over an internal antenna of the communication device for efficient RF coupling therebetween and has a size that provides for minimum interference and detuning of the cell phone's internal antenna. The probe is dielectrically loaded allowing for parallel operation of the cell phone's antenna and the sleeve's antenna for reception of RF signals, and has such small size as to allow the device's transmissions to be unaffected by the presence of the probe. The sleeve may be configured for mounting on the back of a cell phone or other communication device. A transmission line also embedded in the sleeve enables signal conduction from the probe to an antenna mounted on one side of the sleeve. The external antenna provides enhanced signal reception and transmission. Furthermore the sleeve is adapted to receive a cable from a remote antenna, for instance, one of the type magnetically secured to the top of a vehicle, for further increasing the range of a cell phone. These and other construction/operating features provide the following benefits of the presently described apparatus.

The sleeve is adapted to be securely nested with an existing cell phone.

The sleeve provides relatively little additional size and weight to the nested cell phone.

The sleeve increases the range of the cell phone.

The sleeve has an integrated construction so that it is relatively inexpensive to manufacture and durable in use.

The sleeve is able to combine the reception and transmission capacities of a nested cell phone's built-in antenna with an external antenna mounted on the sleeve, or a remote antenna, for greatly improved RF reception and transmission.

The sleeve is ergonomically designed to provide for hand position convenience when being held while avoiding electrostatic interference with its external antenna.

The details of one or more embodiments of these concepts are set forth in the accompanying drawings and the description below. Other features, objects, and advantages of these concepts will be apparent from the description and drawings, and from the claims.

DESCRIPTION OF DRAWINGS

FIG. 1A is a perspective view of the presently described sleeve;

FIG. 1B is a partial sectional side view of the sleeve taken from cutting plane 1B-1B and additionally showing a portion of a nested cell phone within the sleeve.

FIG. 2 is a sectional view taken from cutting plane 2-2 in FIG. 1 showing a portion of a nested cell phone above a portion of the sleeve;

Like reference symbols in the various drawing figures indicate like elements.

DETAILED DESCRIPTION

Figure 3:
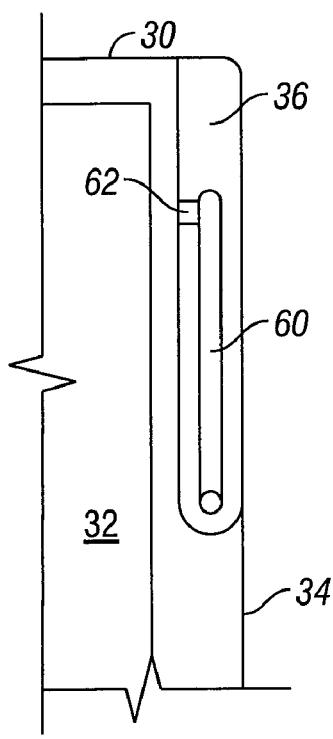
FIG. 3 is a partial plan view of the upper right corner of the sleeve of FIG. 1 showing an embodiment having a recess in the side wall wherein an antenna is stored.

FIG. 1A illustrates a re-radiating cell phone sleeve assembly 10, referred to herein as sleeve 10, capable of conforming to, and nesting with, a cell phone 20 or similar portable wireless device which is not a part of sleeve 10. The term cell phone 20 is used throughout this description and it should be recognized that this term may refer to a cellular telephone or any other portable RF communication apparatus and sleeve 10 may be fabricated to dimensions that will accept each different size cell phone 20. Sleeve 10 includes a full or partial enclosure 30 made of a conformable material such as rubber, rubberized plastic, a plastic and rubber combination, or a combination of plastic polymers. Enclosure 30 is capable of tightly fitting over and around at least a portion of cell phone 20 against which cell phone 20 will contact and rest when nested with sleeve 10. In the preferred embodiment shown in FIGS. 1A and 1B, enclosure 30 has a bottom panel 32 integral with a surrounding side wall 34 which has an internal lip flange 36 all around. When cell phone 20 is nested within sleeve 10, the lip flange 36 extends over a portion of a face 22 of cell phone 20 so as to secure cell phone 20 within sleeve 10 as best shown in FIG. 1B. Also, the material of which enclosure 30 is fabricated may have an elasticity characteristic so that it may be stretched slightly to nest with cell phone 20 and therefore sleeve 10 is held on cell phone 20 by elastic compression. This prevents movement of cell phone 20 within sleeve 10.

A planar multi-layer radio frequency (RF) coupling probe 40 is embedded within the enclosure 30 by insertion injection molding in a location that is in close proximity to, and may lay directly under, an internal antenna 50 of the cell phone 20 when it is nested. In this manner, the probe 40 is in a position for electromagnetic coupling with antenna 50 and therefore is able to provide for boosting of the cell phone's signals. Inductive, capacitive or other types of electromagnetic coupling may be used.

As shown in FIG. 2, probe 40 may have a multilayer planar construction including a first material layer 44, such as, but not limited to fiberglass epoxy or thermoset laminate of low relative dielectric constant typically in the range of DK=2 to DK=5; a second patterned metallization layer 45 of copper, silver-filled paste or other metal having similar properties, which is deposited or printed on one side of the first layer 44 and may have a material thickness of about 0.7 to 1.4 mils, thereby forming a distributed resonant circuit, and a third material layer 46 such as a ceramic-filled laminate having a relatively high dielectric constant typically in the range of DK=20 to DK=50, whereby layer 46 may be in intimate face-to-face contact with second layer 45. Probe 40 may be square or rectangular in shape with sides of between about 0.25 to 0.30 inches in length. An important characteristic of probe 40 is that it functions as an anti-resonant network because of its high capacitance-to-inductance ratio which enables near field coupling and may be reception band selective by virtue of its unloaded high-Q quality factor. A band selectivity enablement may provide multi-band resonance, for example, resonance for one or more frequency bands such as: 700, 850, 900, 1800, 1900, and 2100 MHz and, or others.

Figure 6:
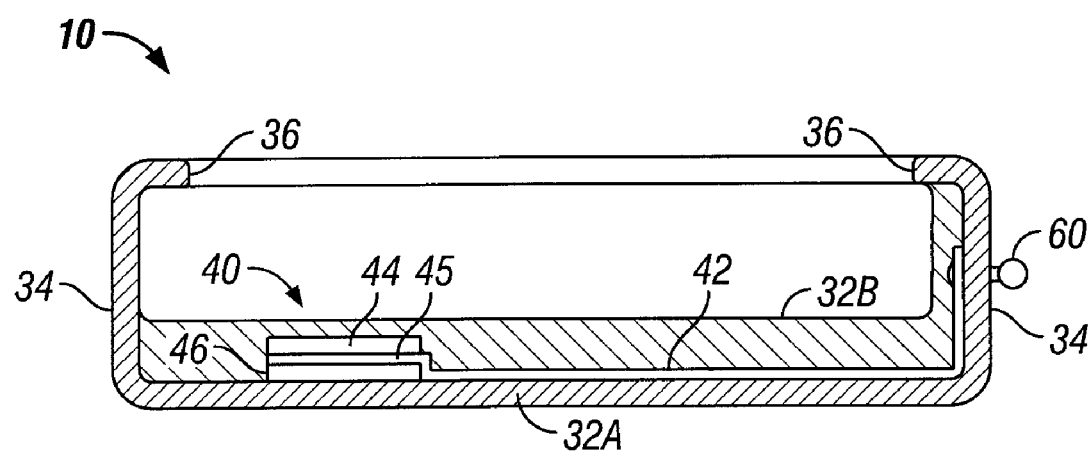
FIG. 6 is the sectional view of FIG. 5 showing a second molding step in embedding a probe and signal transmission conductor within the bottom panel of the sleeve.

An external antenna 60, as shown in FIGS. 1A, 3, and 6 may be mounted on and in parallel alignment with the surrounding side wall 34 as shown in FIG. 1, and a transmission line 42 embedded within the bottom panel 32 may join probe 40 with external antenna 60 for RF signal transfer therebetween. Transmission line 42 may be a metallized or printed strip. This arrangement enables RF transmission/reception at both the antennas 50 and 60 simultaneously without experiencing mutual interference. Antenna 60 may be mounted on enclosure 30 using a mechanical swivel joint 62 so that antenna 60 is able to be rotated between a retracted position 60A, shown in dashed line in FIG. 1A, and an extended position 60B. Antenna 60 may be of any type including a simple rigid rod, or telescoping. Side wall 34 may have a recess 36 as shown in FIG. 3 for enclosing antenna 60 when retracted, for more compact storage. The antenna 60 may be operational in both its retracted position 60A as well as its extended position 60B. Enclosure 30 provides a hand grip surface 38 which is positioned so as to leave clearance between antenna 60 when in the refracted position 60A and a user's hand when holding sleeve assembly 10.

Figure 4:
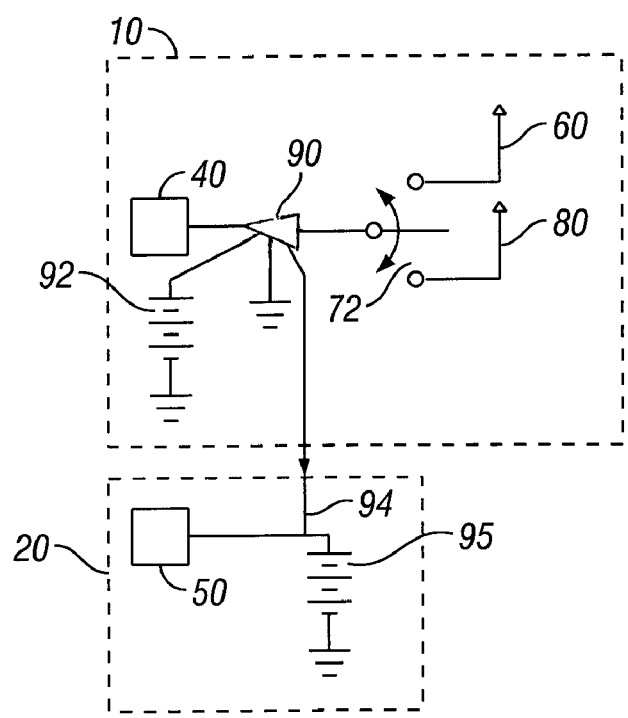
FIG. 4 is an electrical schematic diagram of the sleeve and the cell phone showing and electrical interconnection whereby the cell phone battery provides power to an amplifier in the sleeve circuit.

Enclosure 30 may have a remote antenna port 70, a connector, molded into side wall 34 as shown in FIG. 1A. A toggle switch 72 may also be molded into side wall 34, also shown in FIG. 1A. Switch 72 may function to select either external antenna 60 or remote antenna 80 as illustrated in FIG. 4. Port 70 may be in signal communication with probe 40 via a further conductor 74 embedded in bottom panel 32.

An signal boosting amplifier 90 may be embedded in bottom panel 32 and interconnected with transmission line 42. Amplifier 90 may be single or bi-directional and may be enabled with diplexers, duplexers and automatic gain control (AGC) and other features for improved performance as would be known by those of skill in the art. Amplifier 90, preferably a planar device, may be powered by a replaceable battery 92 mounted in side wall 34, and in electrical interconnection therewith by a further embedded conductor (not shown). Alternately, the cell phone's battery 95 may be interconnected with amplifier 90 via an interconnecting wire as shown in FIG. 4. Interconnection may be via an interconnecting conductor with plug termination 94 which may conform, for instance, to the Universal Standard Bus (USB) protocol or otherwise.

As described above, the sleeve 10 taken by itself defines one embodiment of the present apparatus. The sleeve 10 as nested with cell phone 20 defines a second embodiment.

Figure 5:
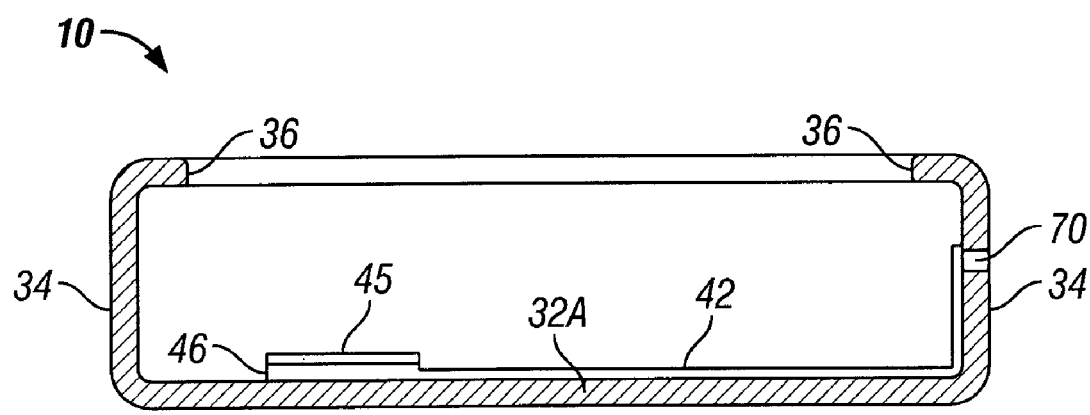
FIG. 5 is a sectional view taken from cutting plane 5, 6-5,6 showing a first molding step in embedding a probe and signal transmission conductor within the bottom panel of the sleeve.

The enclosure 30 may be fabricated by injection molding techniques. In a preferred approach, a first molding step fabricates a first layer 32A of the bottom panel 32 and an outside portion of the side wall 34 on at least one side as shown in FIG. 5. Here, we refer to the right side wall shown in FIG. 1A as just one example. This first step, when completed, is shown as a section view in FIG. 5. Step two includes placement of layer 46 in a selected position on the first molded layer 32A of the bottom panel 32 and then metallizing or printing layer 45 on top of layer 46, and also transmission line strip 42, and potentially other interconnecting conductors at the same time. The conductive layers may extend without breaks to the side wall 34 as shown. This, of course, is accomplished by initially masking off the surfaces that do not receive the metal deposition.

Now referring to FIG. 6, layer 46 is placed in intimate contact with layer 45 and then the partially completed enclosure 30 is placed into an injection molding cavity configured to inject a second layer of resin 34B over the previously formed first layer 32A. thereby completing bottom panel 32 as well as the inside of the side wall 34. As shown, probe 40 and the interconnections to antenna 60, port 70 and switch 72 are fully encapsulated or embedded within bottom panel 32 and side wall 34.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. A re-radiating cell phone sleeve assembly for engaging a cell phone in a nested relationship, the assembly comprising:
   an enclosure having a bottom panel integral with a surrounding side wall;
   the enclosure of a conformable material and a size for tightly fitting over and around at least a portion of the cell phone;
   a planar multi-layer radio frequency coupling probe embedded within the bottom panel and positioned for electromagnetic coupling with an antenna of the cell phone;
   the coupling probe embedded within the bottom panel, the coupling probe having a multilayer planar construction including, in sequence, a first layer of a low dielectric constant material, a second patterned metallization layer, and a third layer of a high dielectric constant material; and an external antenna mounted on the side wall, the antenna and coupling probe joined by a transmission line.

2. The assembly of claim 1 wherein the conformable material is one of rubber, rubberized plastic, a plastic and rubber combination, and a combination of plastic polymers wherein the material has an elasticity characteristic.

3. The assembly of claim 1 wherein the side wall terminates with an internal peripheral lip flange.

4. The assembly of claim 1 wherein the coupling probe has a high capacitance-to-inductance ratio.

5. The assembly of claim 1 wherein coupling probe has a multi-frequency band resonance enabling plural frequency band selectivity including at least one of 700, 850, 900, 1800, 1900, and 2100 MHz.

6. The assembly of claim 1 wherein the electrical transmission line is a metallized path embedded within the bottom panel.

7. The assembly of claim 1 wherein the antenna is secured to the side wall by a swivel joint.

8. The assembly of claim 1 further comprising a remote antenna port enabled for receiving a remote antenna signal.

9. The assembly of claim 8 further comprising a toggle switch interconnected for switching the coupling probe between the external antenna and the remove antenna.

10. The assembly of claim 1 further comprising a signal boosting amplifier embedded within the bottom panel and interconnected with the transmission line for amplifying signals between the external antenna and the coupling probe.

11. A re-radiating assembly comprising:

a planar multi-layer radio frequency coupling probe positioned for electromagnetic coupling with an interior antenna of the assembly;

the coupling probe having a multilayer planar construction including in sequence, a first layer of a low dielectric constant material, a second layer of patterned metallization, and a third layer of a high dielectric constant material; and an external antenna of the assembly joined with the coupling probe by a transmission line.

12. An assembly comprising:

a planar multi-layer radio frequency coupling probe positioned for electromagnetic coupling with an antenna of the assembly;

the coupling probe having a multilayer planar construction including in sequence, a first layer of a low dielectric constant material, a second layer of patterned metallization, and a third layer of a high dielectric constant material.

* * * * *